United States Patent [19]

Danielson

[11] Patent Number: 4,687,220

[45] Date of Patent: Aug. 18, 1987

[54] TRAILER HITCH COUPLING DEVICE

[76] Inventor: Oscar Danielson, 900 Tascosa St., Trinidad, Colo. 81082

[21] Appl. No.: 795,087

[22] Filed: Nov. 5, 1985

[51] Int. Cl.$^4$ .............................................. B60Q 1/00
[52] U.S. Cl. ..................................... 280/477; 33/264; 116/28 R
[58] Field of Search ................... 280/477; 33/264, 286, 33/287, 288; 116/28 R

[56] References Cited

U.S. PATENT DOCUMENTS

| 3,159,917 | 12/1964 | Whitehead | 280/477 X |
| 3,363,318 | 1/1968 | Folkins et al. | 280/477 X |
| 3,858,966 | 1/1975 | Lowell, Jr. | 280/477 X |
| 3,901,536 | 8/1975 | Black | 280/477 |
| 4,065,147 | 12/1977 | Ross | 280/477 |
| 4,192,526 | 3/1980 | Myers | 280/477 |
| 4,614,356 | 9/1986 | Mills | 280/477 |

FOREIGN PATENT DOCUMENTS

2601527 7/1977 Fed. Rep. of Germany ...... 280/477

Primary Examiner—John J. Love
Assistant Examiner—Charles R. Watts
Attorney, Agent, or Firm—Timothy J. Martin

[57] ABSTRACT

Apparatus facilitating the alignment of hitch elements on tractor and trailer vehicles includes elongated telescoping members, one of which is rotatably and adjustably connected to one vehicle. The apparatus projects longitudinally of the vehicle in a generally horizontal plane and carries a signal element at its free end. The signal element is pivotal on the free end and has a visual indicator that moves into view when the signal element contacts a target surface on the other vehicle. The telescoping members may be indexed so that their respective orientations are reproducible.

18 Claims, 15 Drawing Figures

TRAILER HITCH COUPLING DEVICE

BACKGROUND OF THE INVENTION

The present invention relates to an apparatus adapted to assist the driver of a vehicle to maneuver the vehicle into a position that allows ease in coupling the vehicle to a trailer. More particularly, the present invention is directed to a ranging apparatus for aligning the respective hitch elements of the towing vehicle and a trailer vehicle while the driver is seated in the towing vehicle. Thus, the present invention is particularly useful to couple a bulky trailer that cannot easily be handled without the aid of a helper and is applicable to any type of trailer vehicle, especially camper-type trailers.

Recently, with the increase in both leisure time and mobility many individuals are finding enjoyment and relaxation by vacationing in a camping vehicle. Typically these vehicles take three forms. One such camping vehicle is the common camper wherein a camper shell is mounted to a small truck by positioning the camping vehicles or shell within the bed of the truck. In some instances, these campers are formed as an integral part of the truck. A second type of vehicle is a specialized vehicle wherein the driver is actually situated within the camping vehicles while driving. These vehicle range in size from vans to large, self-powered motor homes. The third type of vehicle is that of a trailer that is adapted to be towed by a tractor vehicle such as a car or truck. These camper trailers range in size from small, lightweight trailer frames having expandable canvas or tent-like structures to full-scale trailers sleeping a relatively large number of people.

One problem that is encountered when a vacationer selects a trailer camper, though, is the difficulty experienced in attaching the tow hitch of the towing vehicle to the mating tow hitch of the trailer, especially when this task is attempted without the assistance of another person. This problem results from the fact that it is often necessary to accurately align the hitch elements since the weight of the trailer vehicle prevents the trailer from being manually moved into the position for coupling with the tractor vehicle. Indeed, even slight errors of alignment of the coupling elements makes it difficult to attach the trailer vehicle to the tractor vehicle. Therefore, there is a need for a device that assists the driver in aligning the respective hitch elements as closely as possible.

The recognition of this problem, however, is not new and solutions have been attempted in the past. An example of one prior art device which sought to solve this problem is found in U.S. Pat. No. 3,363,318 issued Jan. 16, 1968 to Folkins et al. In this device an L-shaped bracket is attached to a post on the trailer vehicle and this L-shaped bracket has a forwardly projecting portion that mounts a pivotal signal lever slightly forwardly and above the ball socket of the trailer. A narrow rod extends vertically upwardly from the ball hitch of a tractor vehicle so that, if the tractor vehicle is properly positioned, the upward point of the vertical rod tips the signal lever to indicate that the hitch elements are aligned. A problem manifests in this device, though, where the driver of the tractor vehicle misses his mark since, in absence of the signal, the driver may back the tractor vehicle an excessive distance. In such event, the tractor vehicle can actually strike the towbar of the trailer vehicle thereby potentially causing damage to the tractor vehicle, the trailer vehicle or both.

Other prior art devices also describe structures to assist the coupling of a tractor and trailer vehicle. U.S. Pat. No. 3,818,599 issued June 25, 1974 to Tague discloses first and second telescoping rods mounted to the tractor and trailer vehicle, respectively, adjacent to their respective hitch elements. Each of these devices is secured by the mounting block having position adjustment means, with the rods being oriented somewhat vertically of the hitch elements. A somewhat similar structure is shown in U.S. Pat. No. 3,765,703 issued Oct. 16, 1973 to Voelkerding et al, wherein the vertical rods are positioned on the respective hitch elements of tractor and trailer vehicle with these rods having enlarged balls on their uppermost tips which balls touch to indicate an aligned condition. A problem in both the Tague and the Voelkerding structures, though, is that the respective signalling elements must always be mounted to the tractor vehicle, even after it is uncoupled from the trailer, which may be unsightly and awkward should the tractor vehicle be used for transportation after the trailer is uncoupled.

Yet another structure is described in U.S. Pat. No. 3,767,292 issued Oct. 23, 1973 to Rutkowski wherein a convex mirror is attached by a bracket assembly to the towbar of the trailer vehicle so that the driver may simultaneously view the ball socket and the ball hitch as the tractor vehicle is advanced towards the trailer vehicle. Disadvantages of this device include the distorted dimensional images provided by the convex mirror and the danger of breakage to the mirror from stones and road debris unless the relatively heavy and cumbersome mirror assembly is detached from the trailer vehicle after coupling. U.S. Pat. No. 3,418,628 issued Dec. 24, 1968 to Fenner discloses an electronic signalling assembly wherein three vanes are positioned side by side on the trailer vehicle with these vanes operative to close switches connected to visually perceivable lights. The center vane which corresponds to an aligned position for the hitch elements indicates an aligned condition whereas the left and right vanes indicate that the hitch elements have been positioned slightly out of alignment. Again, there is a problem should the driver of the tractor vehicle entirely miss the vane assembly so that damage may occur to the signalling apparatus, the tractor vehicle, the trailer vehicle, or any combination thereof.

Accordingly, and despite the structures provided by the prior art devices, there remains a need for an inexpensive alignment device which permits both longitudinal and side to side alignment of a tractor and trailer vehicle in a quick and convenient manner. There is further a need for such a device that is simple in mechanical operation requiring no electrical connections and which device may be readily removed when not in use. There is further a need for a coupling device that is adjustable for different vehicles, and which may be stored and then reset when the tractor vehicle is detached from the trailer vehicle.

SUMMARY OF THE INVENTION

It is an object of the present invention to provide a novel and useful trailer hitch alignment apparatus which assists the driver of the vehicle in coupling hitch elements of a tractor and trailer vehicle by signalling to the driver that alignment has ocurred.

It is another object of present invention to provide a simple, inexpensive apparatus that facilitates the alignment of hitch elements and which may be removed and stored when not in use but which may be remounted and preset even when the tractor and trailer vehicles are uncoupled.

It is a further object of the present invention to provide an apparatus to assist a driver in coupling hitch elements and which apparatus signals longitudinal alignment even when lateral alignment has not been attained so as to protect the vehicles and apparatus from damage.

Still another object of the present invention is to provide an apparatus for facilitating the coupling of hitch elements which apparatus is easily connectable and useable with a wide variety of vehicles without the need for specialized mounting elements.

According to the present invention, a simple yet effective apparatus is constructed to be connectable to a tractor and trailer vehicle combination in order to facilitate alignment of their respective hitch elements. In its broad form, the present invention comprises an elongated rod adjustably connectable to one of the tractor and trailer vehicles. This rod carries a signal element having a visually perceivable indicator that signals hitch alignment. Preferably, the invention comprises at least two elongated members which are connected to each other in a telescoping relation along a longitudinal axis and are oriented generally horizontally, so that they will be parallel to the pavement or other support surface for the vehicles. A first one of these elongated members is connectable to the tractor vehicle, preferably by releasable connectors, such as suction cups and the like, and the second elongated member is extendable away from the tractor vehicle to have a free end opposite the first elongated member. This free end may be advanced in the direction of movement of the tractor vehicle and a signal element in the form of a pivot lever, is pivotly mounted to the free end.

The signal element includes a head portion and a tail portion that are gravitationally balanced in a passive state when the elongated members are oriented horizontally so that the tail portion extends outwardly from the free end at a small acute angle to the longitudinal axis of the members. As the tail portion is advanced into position with the movement of the tractor, the tail portion contacts a target surface, such as a vertical strip placed on the trailer vehicle. Upon contact, the tail portion is operative to pivot the signal element in the direction of arrow A so that it moves into an active state. The head portion includes a visual indicator so that, when the active state is achieved, the head portion pivots laterally away from the free end to move the visual indicator into the driver's view. This, then, visually signals proper longitudinal alignment of the hitch elements. When the indicator signal touches the target strip, there is also proper lateral alignment of the hitch elements. Upon both longitudinal and lateral alignments, the driver may park the tractor vehicle, exit the vehicle and couple the respective hitch elements of the tractor and trailer vehicles.

In the preferred embodiment of the invention, the first elongated member is connectable to the side of the tractor vehicle by means of suction cups. In order to ensure a proper operation, a small index marking is placed on the tractor vehicle to designate the proper orientation of the suction cups. Further, the elongated members may be indexed both for positioning of the suction cups and for the proper degree of extension of the telescoping of the second elongating member so that the device may be collapsed when not in use, reattached when desired and extended to the proper position for proper longitudinal alignment. Preferably, one or more intermediate telescoping members are provided between the first and second telescoping members to increase the amount of extension of the apparatus. Further, it is preferred that the first elongated member be allowed to rotate and slide with respect to the connecting mounts so that the signal element may be properly oriented with respect to the gravitational field of the earth; in the alternative, though, the signal element may be spring biased into the passive state so that gravitational orientation is not a constraint. The mounts interconnecting the suction cups and the first elongated member may include adjustment means to vary the spacing between the tractor vehicle and the first elongated member, and additional mounts or yokes may be provided to allow a variety of attachment locations to the vehicle to accommodate many different tractor and trailer configurations.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

The present invention relates to an apparatus used to facilitate the coupling of a tractor vehicle to a trailer vehicle. To accomplish this, the present invention is directed to a mechanical structure which permits both the longitudinal and lateral alignment of the respective hitch elements on the vehicles. The apparatus according to the preferred embodiment of the present invention includes an alignment apparatus attachable to one of the vehicles, preferably the tractor vehicle, which apparatus has a signal element that may be viewed by the driver of the tractor vehicle through one of the vehicle's rearview mirrors. While the present invention is described with respect to a car as the tractor vehicle and a camping trailer, it should be understood and appreciated that the present invention may be used to align the coupling of any tractor and trailer vehicles regardless of their type. Furthermore, it is within the scope of this invention for the alignment apparatus to be secured to the trailer vehicle instead of the tractor vehicle.

Figure 1:
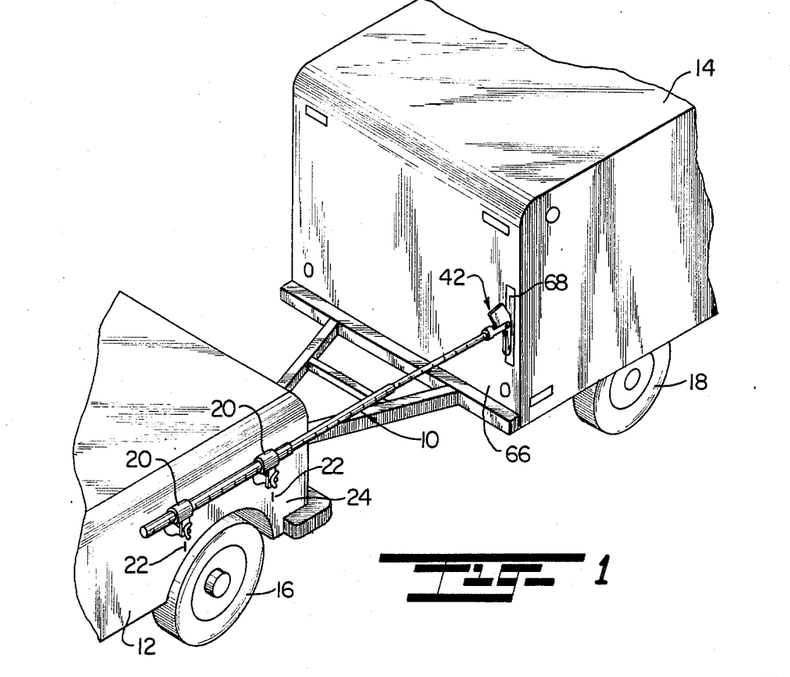
FIG. 1 is a perspective view of the preferred form of the present invention attached to a tractor vehicle and shown aligning the respective hitch couplings of a tractor vehicle and a trailer vehicle.

As is best seen in FIG. 1, alignment apparatus 10 may be secured to a fender 24 of a tractor vehicle 12 to facilitate coupling the hitch elements of tractor vehicle 12 and trailer vehicle 14. Apparatus 10 is oriented generally horizontally and parallel to the longitudinal axis of the vehicles (which corresponds to the direction of the vehicles' travel) as is shown in FIG. 1, and thus substantially parallel to a support surface upon which wheels 16 and 18 of vehicles 12 and 14 rest. Apparatus 10 is mounted on fender 24 of vehicle 12 by a pair of suction mounts 20 that are secured to apparatus 10 and that are positioned at locating endices 22 located on fender 24. Other mounts, such as Velcro fastening strips and permanent mounts could be used as well.

Figure 2:
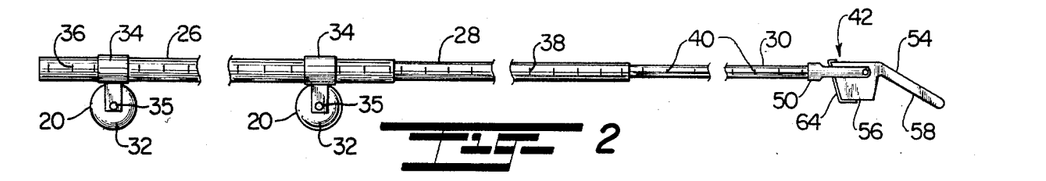
FIG. 2 is a side view in elevation of the alignment apparatus according to the preferred embodiment of the present invention.
Figure 3:
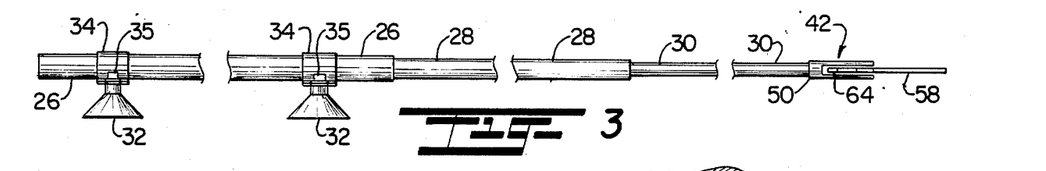
FIG. 3 is a bottom plan view of the invention showed in FIG. 2.
Figure 4:
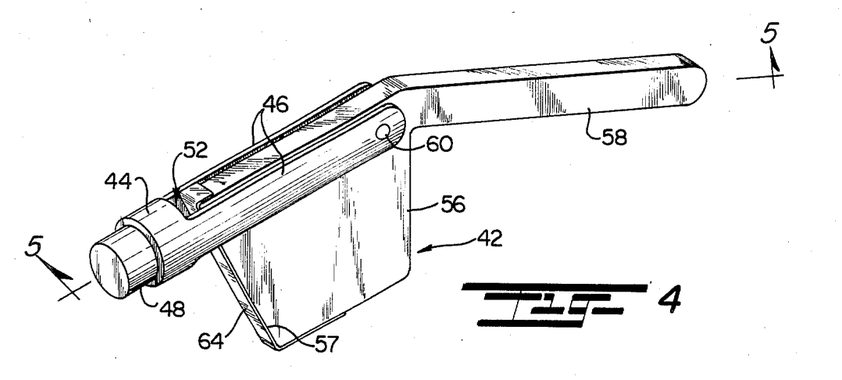
FIG. 4 is a perspective view of the signal element adapted for attachment to the free end of the device shown in FIGS. 2 and 3 and with the signal element in the passive state.

Alignment apparatus 10 is best shown in FIGS. 2 and 3 and includes a plurality of telescoping members. Preferably, alignment apparatus 10 is constructed of three telescoping members although any number of telescoping members is within the scope of this invention. Thus, as is seen in FIG. 2, alignment apparatus 10 includes a first elongated member 26 and a second elongated member 30 which are interconnected to one another by an intermediate elongated member 28. More particularly, first elongated member 26 is a tubular member that slideably and telescopically receives intermediate elongated member 28 which, in turn, slideably and telescopically receives second elongated member 30, all along a common longitudinal axis. Thus, elongated member 30 is adjustably connected to fender 14.

Connecting means, in the form of suction mounts 20, are secured to first elongated member so that elongated member 26 may be attached to vehicle 12. Suction mounts 20 each include a suction cup 32 which is attached to member 24 by a ring clamp 34. Each ring clamp 34 extends around the circumference of tubular elongated member 26 and is secured in clamping relation by a nut 35. When nut 35 is loosened, elongated member 26 may rotate within the ring clamp 34 and may be slid with respect to ring clamp 34 so that a desired relative mounting position is attained. When nut 35 is tightened, ring clamp 34 frictionally grips elongated member 26. Elongated members 26, 28 and 30 have index markings 36, 38 and 40, respectively with these index markings being provided to allow the user to set the relative orientation of each of these elongated members with respect to one another, as described more thoroughly below. It should also be appreciated that the relative positioning of ring clamps 34 may be set at a desired location with respect to index markings 36 on elongated member 26.

Figures 5, 6:
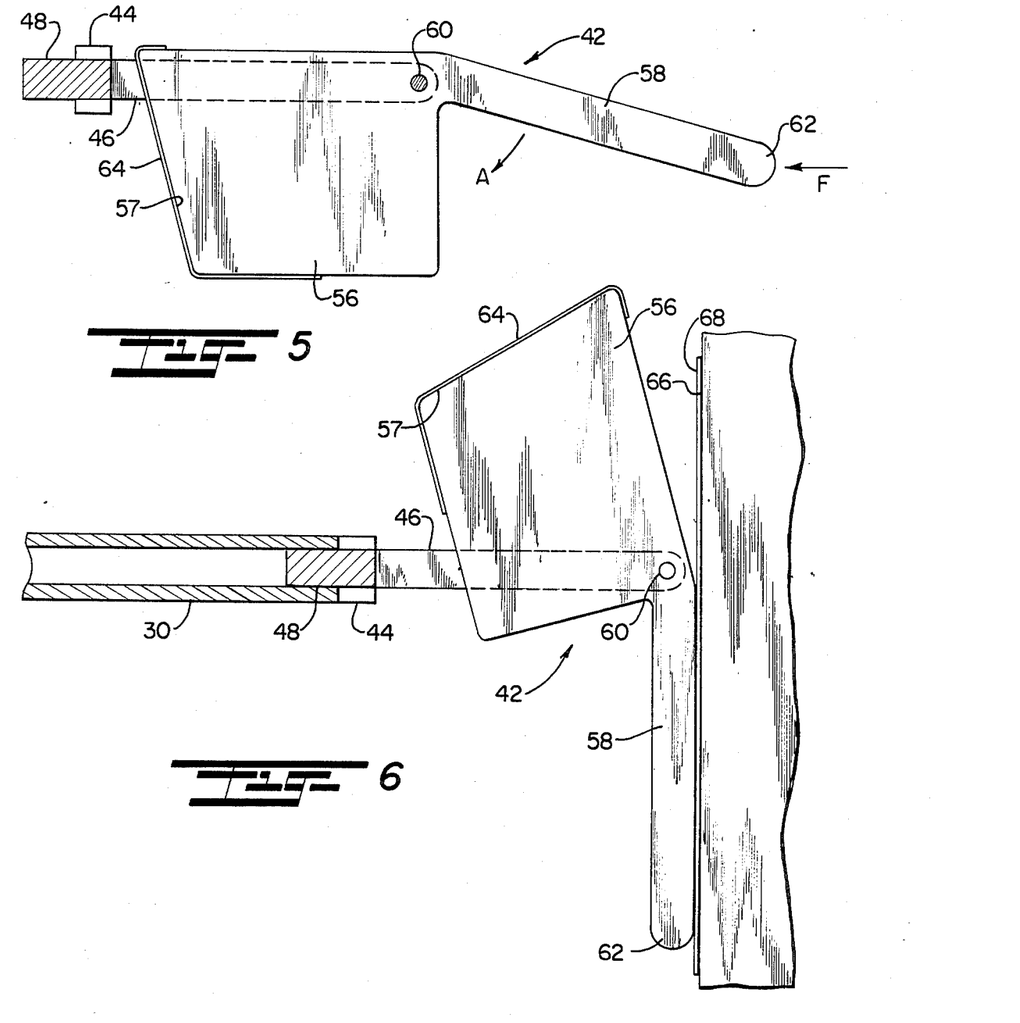
FIG. 5 is a cross-sectional view taken about lines 5—5 of FIG. 4.
FIG. 6 is a side view in partial cross-section showing the preferred embodiment of the signal element contacting the target surface of the trailer vehicle in the active state.

In order that the driver of tractor vehicle 12 knows when the respective hitch mounts of tractor vehicle 12 and trailer vehicle 14 are aligned longitudinally, alignment apparatus 10 includes a signal element 42 which is mounted on the free end 50 of second elongated member 30 which free end is opposite first elongated member 26. Signal element 42 is best shown in FIGS. 2-6. As is shown in these figures, the preferred signal element has a bifurcated support 44 having a pair of spaced-apart, parallel arms 46 projecting in an opposite direction from a mounting plug 48 adapted to be inserted into the end 50 of second elongated member 30. Arms 46 define an open region 52 therebetween. A signal flag 54 is defined by an enlarged, flat trapezoidal head portion 56 having an elongated finger or tail portion 58 oriented at an acute angle thereto so that tail portion 58 is at an angle with respect to the longitudinal axis of elongated members 26, 28 and 30. Signal flag 54 is rotatably journaled on a shaft 60 extending between arms 46 so that it may freely pivot in region 52. The mounting location of signal flag 54 on shaft 60 is such that, when alignment apparatus 10 is oriented horizontally, head portion 56 and tail portion 58 are balanced in a passive state in the position thus shown in FIGS. 2 and 5. However, when a longitudinal force F is applied to end 62 of tail portion 58, tail portion 58 swings downwardly until it is substantially vertical, thus raising head portion 56 to indicate an active state as is shown in FIG. 6. A visual indicator 64 is provided on a forward edge of head portion 56 so that, when signal flag 54 moves into the active state, visual indicator 64 moves into the view of the driver. Visual indicator 64 may be a colored band placed on the edge 57 of head portion 56.

The operation of the preferred embodiment of the present invention may now be appreciated more thoroughly. Specifically, when the tractor vehicle 12 is hitched to the trailer vehicle 14, and before they are uncoupled, the user extends the telescoping members so that a signal device 42 may be pressed against a target surface 66 on trailer vehicle 14, as is shown in FIG. 5 and 6. The user adjusts the position of ring clamps 34, as desired, so that elongated member 26 may be attached to fender 24 with alignment apparatus 10 projecting longitudinally rearwardly of tractor vehicle 12, for advancement therewith. Once the desired location of suction mounts 20 are established, the user indexes fender 24 by means of index markings 22, which are selected to be of a type that will not damage the finish of the vehicle, and the user notes the relative positioning of members 26, 28 and 30 by means of their respective markings 36, 38 and 40. A narrow target marker 68, such as a colored tape or a stripe is placed on trailer vehicle 14. Thus, when signal flag 54 is in the active state, the vehicles are longitudinally aligned, and when tail portion 58 contacts stripe 68, the respective hitch mounts of vehicles 12 and 14 are also laterally aligned. The user may then uncouple the tractor and trailer vehicles and remove alignment apparatus 10 from the tractor vehicle.

When it is again desired to couple the vehicles, the user positions mounts 20 at index markings 22 and telescopes elongated members 26, 28 and 30 to their respectively noted indexed positions. It should be appreciated that alignment apparatus 10 is placed generally horizontally on vehicle 12 and member 26 rotated so that signal device 42 is in the passive state as is shown in FIG. 2. The driver then backs vehicle 12 toward trailer vehicle 14 while watching signal element 42. The driver guides vehicle 12 so that tail portion 58 impacts stripe 68. Since tail portion 58 is at a small angle to the horizon, tail portion 58 will then pivot downwardly thus moving head portion 56 upwardly so that visual indicator 64 may be easily viewed by the driver. When this occurs, the driver will know that the hitch elements are aligned.

In the event that the driver moves tractor vehicle 12 too close to trailer vehicle 14, telescoping members 26, 28 and 30 will collapse without damaging the alignment apparatus. Further, even if the driver improperly aligns tail portion 58 with stripe 68, signal flag 58 will nonetheless impact target surface 66 of the trailer to indicate that longitudinal alignment has occurred. Thus, even where lateral alignment is not proper, the driver will realize that the hitch elements are in longitudinal alignment and will not need to back the vehicle further, thus avoiding possible damage to the tractor or trailer vehicle caused by backing the vehicles too close so that the hitch element of the trailer vehicle strikes the body of the tractor vehicle. It should also be appreciated that, after coupling of the tractor and trailer vehicle, this apparatus aids the driver in backing the trailer in a straight line by observing the relative positions of the signal element and target strip.

Figure 7:
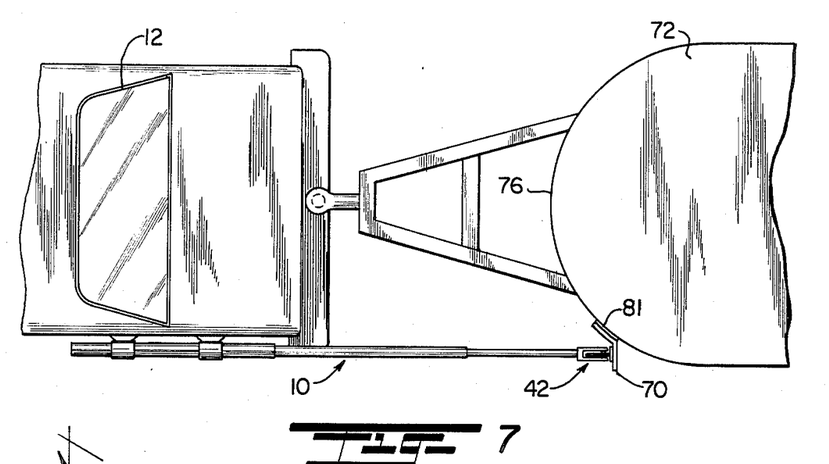
FIG. 7 is a top plan view of the present invention shown with an optional strike plate adapted to be attached to the trailer vehicle.
Figure 8:
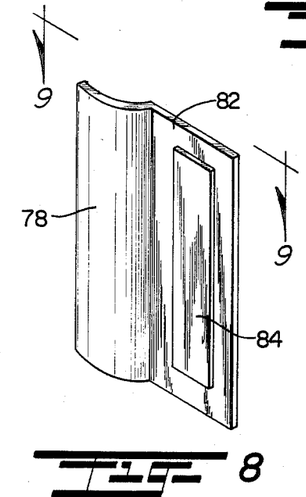
FIG. 8 is a perspective view of the strike plate shown in FIG. 7.
Figure 9:
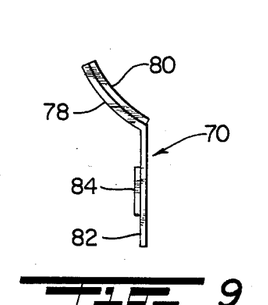
FIG. 9 is a cross-sectional view taken about lines 9—9 of FIG. 8.

In some instances, a trailer vehicle does not have a transverse target surface so that it is necessary to provide this target surface for alignment apparatus 10. As is shown in FIG. 7, trailer vehicle 72 has a forward arcuate surface 76. It is difficult for alignment apparatus 10 to directly contact surface 76. To solve this problem an auxiliary strike plate 70 attaches onto a trailer vehicle 72. Here, strike plate 70 is in the form of a bracket having an arcuate attachment piece 78 having the same radius of curvature as surface 76 and receiving a hook and loop fastening strip, such as Velcro strip 80, so that strike plate 70 may be releasably secured on surface 76. To this mating strip 81 is adhered onto surface 76 at the desired attachment location. A flat target plate 82 extends outwardly from arcuate plate 78 so that plate 82 is oriented perpendicularly to the longitudinal axis of alignment apparatus 10 and vehicles 12 and 72. Target strip 84 is placed on plate 82. Thus, the operation of the device becomes the same as that described with respect to the preferred embodiment of the present invention. It should be further noted, though, that the positioning of strike plate 70 must always be the same on surface 76 so that surface 76 should be marked in any suitable manner so that strike plate 70 may be properly oriented.

Figure 10:
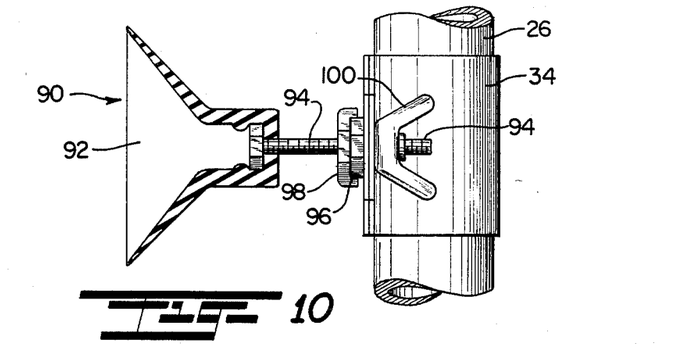
FIG. 10 is a side view in partial cross section of an alternate embodiment of a connecting element utilizing an adjustment mechanism adapted to be used with the preferred embodiment of the present invention.

FIGS. 10-14 disclose alternate mounts for the alignment apparatus 10, and it should be appreciated that various additional mounts are within the scope of the present invention. A first alternate embodiment of the connecting means for connecting alignment apparatus 10 to one of the vehicles is shown in FIG. 10. Here, an adjustable connector 90 is in the form of a suction mount having a suction cup 92 which receives threaded bolt 94 along the central axis. A first nut 96 may be threaded to a desired location on bolt 94, which position corresponds to the desired spacing for the alignment apparatus from the support surface. A locking nut 98, also threaded on bolt 94, may be moved into position to releasably lock nut 96 into position. Ring clamp 34 is then positioned on bolt 94 and is secured into its clamping position by means of wing nut 100, much in the manner of that described with respect to the preferred embodiment. This adjustable suction mount allows for small amount of spaced orientation for first elongated member 26 when it is desired to compensate for small curvatures of a vehicle fender.

Figure 11:
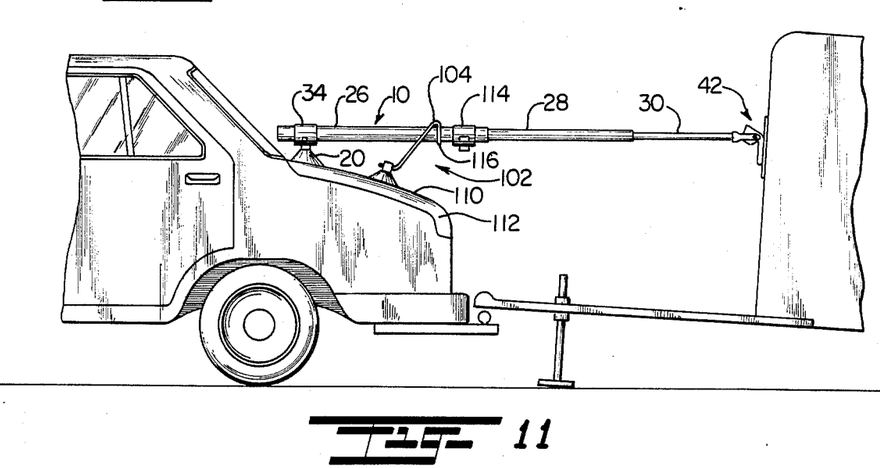
FIG. 11 is a side view in elevation of a second alternate embodiment of the connecting mounts used with the preferred embodiment of the present invention and shown in an operative condition for coupling a tractor and a trailer vehicle.
Figure 12:
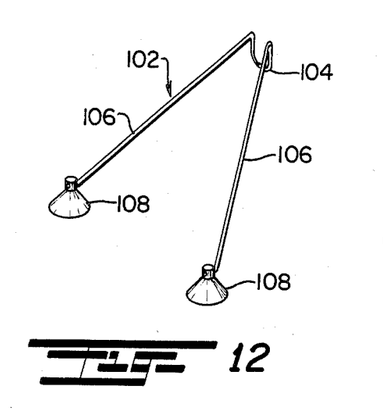
FIG. 12 is a perspective view of the alternate connecting mount shown in FIG. 11.

In situations where attachment of the alignment apparatus requires adjustment for a greater amount of curvature, an optional suction cup mount including a yoke assembly may be provided. As is shown in FIGS. 11 and 12, yoke mount 102 is constructed to include a yoke portion 104 adapted to extend partially around elongated member 26 to support elongated member 26 against downward movement. A pair of downwardly depending legs 106 have lower feet mounted to suction cups 108 so that suction cups 108 may be releasibly attached to a surface 110 of vehicle 112. Ring clamp 114 includes a finger 116 adapted to extend across yoke portion 104, as is shown in FIG. 11, to secure yoke portion 104 to alignment apparatus 10. This type of mount is particularly useful for attaching the alignment apparatus on to a mid-portion of a car or truck so that the alignment apparatus projects longitudinally along the center line of the car towards a center front portion of the trailer vehicle.

Figure 13:
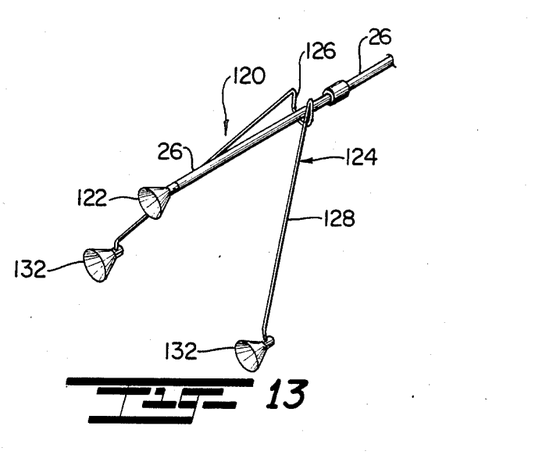
FIG. 13 is a perspective view of a third embodiment of a connecting mount adapted to be used in cooperation with the preferred embodiment of the present invention.
Figure 14:
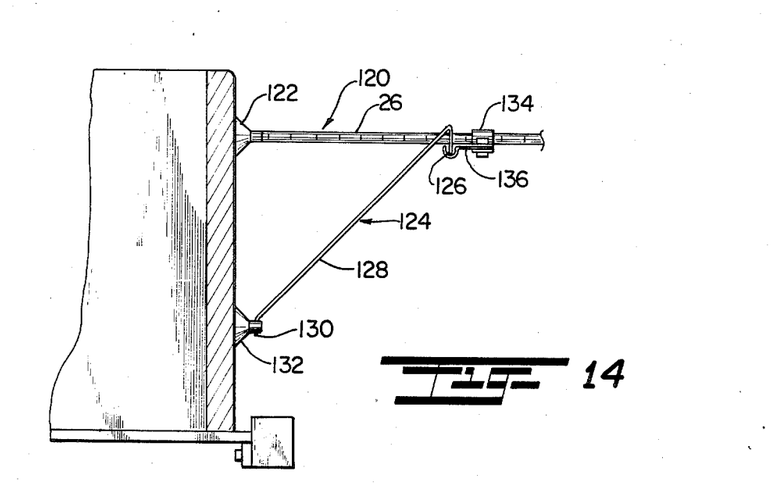
FIG. 14 is a side view in elevation of the connecting mount shown in FIG. 13 attached to a tractor vehicle.

Another mounting structure is shown in FIGS. 13 and 14. Here, attachment is provided for a substantially vertical surface, such as the tailgate of a truck or the like. As is shown in FIGS. 13 and 14, the tailgate mount 120 includes a first suction cup 122 that receives the end of elongated member 26 opposite the signal device 42. A cantilever type yoke assembly 124 supports a mid-portion of elongated member 26 and includes a yoke portion 126 from which a pair of legs 128 downwardly depend. Each of legs 128 terminate in feet 130 that mount suction cups 132 in any convenient manner. Ring clamp 134 includes a finger 136 that locks yoke portion 126 and elongated member 26 in the supported relationship.

Figure 15:
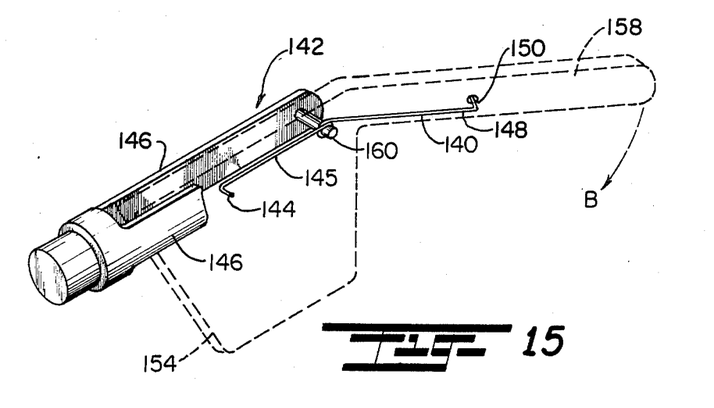
FIG. 15 is a perspective view in partial cross-section showing the signalling element of the present invention used in cooperation with a biasing element.

It should be appreciated from the foregoing, that the elongated members which telescope with respect to one another are also rotatable with respect to one another and are releasably rotatable within their various ring clamps. This allows a wide variety of adjustment to be obtained once the positioning and adjustment of the selectable mounts in the form of suction cups have been achieved. The ability for a relative rotation of the parts allows the proper orientation of signal device 42 with the field of gravity so that it is normally at rest in the passive state. As is shown in FIG. 15, though, it is entirely possible within the scope of this invention to include a small biasing spring 140 mounted around shaft 160 to bias signal device 142 into the passive state. Spring 140 has a finger 144 extending laterally of an arm 145 so that finger 144 will engage arm 146 of device 142. Arm 148 of spring 140 has a laterally projecting finger 150 which engages tail portion 158 of signal device 142. This avoids the necessity of orienting signal flag 154 with respect to the gravitational field since spring 140 bias the signal flag against pivotal rotation in the direction of arrow B. Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. Apparatus adapted to assist a driver of a tractor vehicle which normally moves in a direction of travel corresponding to the tractor vehicle's longitudinal axis when maneuvering the tractor vehicle into position with respect to a trailer vehicle in order to couple respective mateable hitch elements on the tractor and trailer vehicle by visually signalling that the hitch elements are aligned with one another, comprising:

first and second elongated members connected to each other in freely telescoping relation along a common axis, said first elongated member connectable to the tractor vehicle and said second elongated member extendable away from the tractor vehicle when the first elongated member is secured to the tractor vehicle and having a free end opposite said first elongated member;

connecting means for connecting said first elongated member to the tractor vehicle in a generally horizontal orientation generally parallel to the longitudinal axis of the tractor vehicle whereby said free end may be advanced in a direction of movement of the tractor vehicle; and a signal element having a head portion and a tail portion and being pivotally mounted on said free end about a pivot axis such that the head portion and the tail portion are in a passive state when the elongated members are in the horizontal orientation, said tail portion extending outwardly from said free end in a direction opposite said first elongated member and at a small acute angle to the longitudinal axis, said tail portion to be advanced with movement of the tractor vehicle toward contact with a target surface and operative upon contact with the target surface to pivot said signal element into an active state; said head portion including a visual indicator means for visually signalling the occurrence of the active state, said indicator means being out of the driver's view when said signal element is in the passive state yet moving into the driver's view when the signal element is pivoted into the active state.

2. Apparatus according to claim 1 wherein said first elongated member may be rotated about its longitudinal axis with respect to said connecting means, said connecting means frictionally retaining said first elongated member at a desired rotational position.

3. Apparatus according to claim 2 wherein said connecting means includes a pair of brackets each having a collar rotatably receiving said first elongated member, each said collar having a suction cup element adapted to be connected to a surface of the tractor vehicle.

4. Apparatus according to claim 3 including elevation adjustment means on at least one of said brackets for selectively adjusting the distance between its respective said collar and its respective said suction cup element.

5. Apparatus according to claim 3 wherein one of said brackets includes a V-shaped support truss supporting its said collar, said support truss having a pair of spaced-apart legs each having a suction cup element on its free end.

6. Apparatus according to claim 2 wherein said connecting means includes a V-shaped truss support having spaced-apart legs connected at a vertex, said truss support rotationally receiving said first elongated member at its vertex and having first and second suction cup elements on the respective free ends of its spaced-apart legs and a third suction cup element rotationally secured at an end of said first elongated member opposite said second elongated member free end.

7. Apparatus according to claim 1 wherein the free end of said second elongated member being defined by a pair of spaced-apart parallel arms, said signal element mounted on an axle journalled transversely between said arms so that said head portion is located between said arms when said signal element is in the passive state.

8. Apparatus according to claim 7 wherein said head portion is defined by an enlarged plate having a leading edge facing said first elongated member, said tail portion being defined by a finger extending from said plate oppositely of said leading edge, said visual indicator including a colored band on said leading edge.

9. Apparatus according to claim 8 wherein said plate is trapezoidal in shape.

10. Apparatus according to claim 1 wherein said signal element is rotatable about said common axis, and wherein said head and tail portions are dimensioned and oriented with respect to the pivot axis so that the force of gravity acting on the center of mass of the signal element places said signal in said passive state.

11. Apparatus according to claim 1 including bias means for biasing said signal element into said passive state.

12. Apparatus according to claim 1 including at least one intermediate elongated member telescopically interconnecting said first and second elongated members, at least one of said elongated members having index markings to permit selective indexing of the telescopic orientation thereof with another of said elongated members.

13. Apparatus adapted to assist coupling of hitch elements on a tractor vehicle and a trailer vehicle having longitudinal axes by visually signalling alignment of the hitch elements, comprising:

an elongated signal member having a first end adapted for connection to a first one of the tractor and trailer vehicles and a second end opposite said first end and being formed by at least two freely telescoping portions;

adjustable connecting means for connecting said first end to said first one vehicle at a selectively adjustable location along a line parallel the longitudinal axis of the first one vehicle; said first elongated member oriented generally parallel to the longitudinal axis of the first one vehicle with said second end projecting toward a second one of said tractor and trailer vehicles;

a target element mounted on said second one vehicle; and a signal element pivotally secured to said second end on a pivot axis and pivotable between a passive state when the signal element is out of contact with said target element and an active state when the signal element is in contact with said target element, said signal element carrying a visual indicator which is exposed when said signal element moves into the active state, said elongated member being adjustably positionable on said first one vehicle so that said active state corresponds to alignment of said hitch elements when said signal element contacts said target element.

14. Apparatus according to claim 13 wherein said adjustable connecting means includes a primary elongated member telescopically receiving said elongated signal member and having releaseable mounting elements secured thereto operative to mount said primary elongated member and said elongated signal member to said first one vehicle.

15. Apparatus according to claim 14 wherein said mounting elements include a pair of ring clamps slideably and rotatably receiving said primary elongated member when loose, yet operative on tightening to frictionally lock said primary elongated member against sliding and rotational movement, and a suction cup attached to each of said ring clamps.

16. Apparatus according to claim 15 wherein said primary elongated member has first index markings whereby the selected location of said ring clamps around said primary elongated member may be indexed, said signal elongated member including second index markings to allow indexing of the telescopic positioning of said signal elongated member with respect to said primary elongated member.

17. Apparatus according to claim 16 including an intermediate elongated member telescopically interconnecting said elongated signal member and said primary elongated member and having third index markings to allow indexing of the selected telescopic positioning of said intermediate elongated member with respect to said primary elongated member, said second index markings allowing indexing of the selected positioning of said elongated signal member with respect to said intermediate elongated member.

18. Apparatus according to claim 13 wherein said target element includes a bracket releaseably secured to said second one vehicle and a narrow target strip vertically oriented thereon when said bracket is secured to said second one vehicle.

* * * * *